(12) United States Patent
Li

(10) Patent No.: US 8,613,129 B2
(45) Date of Patent: Dec. 24, 2013

(54) MILLING AND TURNING COMPOSITE WORKING MACHINE

(75) Inventor: Kuo-Hao Li, Taichung (TW)

(73) Assignee: King Rich Industries Co., Ltd., Taichung (TW)

( * ) Notice: Subject to any disclaimer, the term of this patent is extended or adjusted under 35 U.S.C. 154(b) by 417 days.

(21) Appl. No.: 13/039,461

(22) Filed: Mar. 3, 2011

(65) Prior Publication Data

US 2011/0225784 A1   Sep. 22, 2011

(30) Foreign Application Priority Data

Mar. 16, 2010  (TW) ................................ 99204552 U

(51) Int. Cl.
*B23B 21/00*  (2006.01)
*B23B 3/06*  (2006.01)

(52) U.S. Cl.
USPC ................ 29/27 C; 29/27 R; 82/123; 82/137; 82/132

(58) Field of Classification Search
USPC .................... 29/27 C, 27 R; 82/123, 132–141
See application file for complete search history.

(56) References Cited

U.S. PATENT DOCUMENTS

| | | | | | |
|---|---|---|---|---|---|
| 1,338,456 | A | * | 4/1920 | Jacobson et al. ............... | 29/27 C |
| 2,074,844 | A | * | 3/1937 | Hill ................................ | 409/240 |
| 3,295,414 | A | * | 1/1967 | Szwadowski ................ | 409/240 |
| 4,632,615 | A | * | 12/1986 | Yamamura .................... | 409/235 |
| 5,052,089 | A | * | 10/1991 | Gadaud et al. ................ | 29/27 R |
| 5,765,456 | A | * | 6/1998 | Grossmann .................... | 82/1.11 |
| 5,964,016 | A | * | 10/1999 | Ito et al. ......................... | 29/27 C |
| 6,618,917 | B2 | * | 9/2003 | Sugiura et al. ................ | 29/27 C |
| 7,043,805 | B2 | * | 5/2006 | Tokuma et al. ............... | 29/27 C |
| 7,137,939 | B2 | * | 11/2006 | Ueda .............................. | 483/27 |
| 7,240,412 | B2 | * | 7/2007 | Sasazawa et al. ............. | 29/27 C |
| 7,266,871 | B2 | * | 9/2007 | Takeuchi et al. .............. | 29/27 C |
| 7,506,423 | B2 | * | 3/2009 | Iwabuchi et al. ............. | 29/27 C |
| 8,419,323 | B2 | * | 4/2013 | Faigle et al. .................. | 409/132 |

FOREIGN PATENT DOCUMENTS

| | | | | |
|---|---|---|---|---|
| DE | 4105768 A1 | * | 8/1992 | ............... B23B 3/06 |
| GB | 2184679 A | * | 7/1987 | ............... B23B 3/06 |
| JP | 61131803 A | * | 6/1986 | ............. B23B 21/00 |
| JP | 04283003 A | * | 10/1992 | ............. B23B 21/00 |
| JP | 05138402 A | * | 6/1993 | ............... B23B 3/06 |

* cited by examiner

*Primary Examiner* — David Bryant
*Assistant Examiner* — Jason L Vaughan
(74) *Attorney, Agent, or Firm* — Alan Kamrath; Kamrath IP Lawfirm, P.A.

(57) ABSTRACT

A working machine includes a base, at least one z-axis track mounted on the base, a secondary z-axis track mounted on the base, at least one z-axis saddle mounted on the z-axis track, a secondary z-axis saddle mounted on the secondary z-axis track, at least one x-axis track mounted on the z-axis saddle, at least one x-axis slide mounted on the x-axis track, at least one upright support mounted on the x-axis slide, and at least one y-axis track mounted on the upright support. Thus, the y-axis track is disposed at a vertical state so that the y-axis track is operated exactly and stably to facilitate operation of the working machine and to enhance the working precision and stability of the working machine.

3 Claims, 12 Drawing Sheets

MILLING AND TURNING COMPOSITE WORKING MACHINE

BACKGROUND OF THE INVENTION

1. Field of the Invention

The present invention relates to a working machine and, more particularly, to a composite working machine for milling and turning purposes.

2. Description of the Related Art

A first conventional working machine in accordance with the prior art shown in FIG. 1 comprises a base 1, an x-axis track 4 mounted on base 1, a y-axis track 3 mounted on the x-axis track 4, and a cutter 2 mounted on the y-axis track 3. The x-axis track 4 is movable in the X-axis direction, and the y-axis track 3 is movable in the Y-axis direction. The y-axis track 3 is inclined relative to the x-axis track 4, and an angle of about thirty degrees (30°) is defined between the y-axis track 3 and the x-axis track 4. However, the y-axis track 3 is not perpendicular to the x-axis track 4 so that it is difficult for a programmer to write the working program and difficult for an operator to calibrate the working precision.

A second conventional working machine in accordance with the prior art shown in FIG. 2 comprises a base 1a, an x-axis track 4a mounted on base 1a, a y-axis track 3a mounted on the x-axis track 4a, and a cutter 2a mounted on the y-axis track 3a. The x-axis track 4a is movable in the X-axis direction, and the y-axis track 3a is movable in the Y-axis direction. The y-axis track 3a is inclined relative to the x-axis track 4a, and an angle of about thirty degrees) (30°) is defined between the y-axis track 3a and the x-axis track 4a. However, the y-axis track 3a is not perpendicular to the x-axis track 4a so that it is difficult for a programmer to write the working program and difficult for an operator to calibrate the working precision.

A third conventional working machine in accordance with the prior art shown in FIG. 3 comprises a base 1b, an x-axis track 4b mounted on base 1b, a y-axis track 3b mounted on the x-axis track 4b, and a cutter 2b mounted on the y-axis track 3b. The x-axis track 4b is movable in the X-axis direction, and the y-axis track 3b is movable in the Y-axis direction. The y-axis track 3b is perpendicular to the x-axis track 4b. However, the y-axis track 3b is disposed at an inclined state and is inclined relative to the ground to produce a force moment so that the center of gravity of the y-axis track 3b is disposed at an unsteady state, and the y-axis track 3b is easily deformed or worn out due to the force moment produced by inclination, thereby shortening the lifetime of the working machine. In addition, the y-axis track 3b is disposed at an inclined state so that the y-axis track 3b is not operated exactly and stably, thereby causing instability and difficulty in operation of the working machine, and thereby decreasing the working precision and stability of the working machine.

BRIEF SUMMARY OF THE INVENTION

In accordance with the present invention, there is provided a working machine, comprising a base, at least one z-axis track mounted on the base, a secondary z-axis track mounted on the base, at least one z-axis saddle slidably mounted on the z-axis track, a secondary z-axis saddle slidably mounted on the secondary z-axis track, a fixed seat mounted on the secondary z-axis track, a movable seat mounted on the secondary z-axis saddle to move in concert with the secondary z-axis saddle and to move relative to the fixed seat, at least one x-axis track mounted on the z-axis saddle, at least one x-axis slide slidably mounted on the x-axis track, at least one upright support mounted on the x-axis slide, at least one y-axis track mounted on the upright support, at least one y-axis slide slidably mounted on the y-axis track, and at least one power cutter mounted on the y-axis slide. Thus, the x-axis track is parallel with the ground so that the x-axis track is disposed at a horizontal state, and the y-axis track is perpendicular to the ground so that the y-axis track is disposed at a vertical state. Therefore, the y-axis track is perpendicular to the x-axis track.

According to the primary advantage of the present invention, the y-axis track is disposed at a vertical state so that the y-axis track is operated exactly and stably so as to facilitate operation of the working machine and to enhance the working precision and stability of the working machine.

According to another advantage of the present invention, the y-axis track is disposed at a vertical state and will not be disposed at an inclined state to prevent from producing a force moment so that the center of gravity of the y-axis track is disposed at a steady state to prevent the y-axis track from being deformed or worn out due to inclination so as to enhance the lifetime of the working machine.

According to a further advantage of the present invention, the y-axis track is disposed at a vertical state to facilitate an operator writing the working program and calibrating the working precision.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
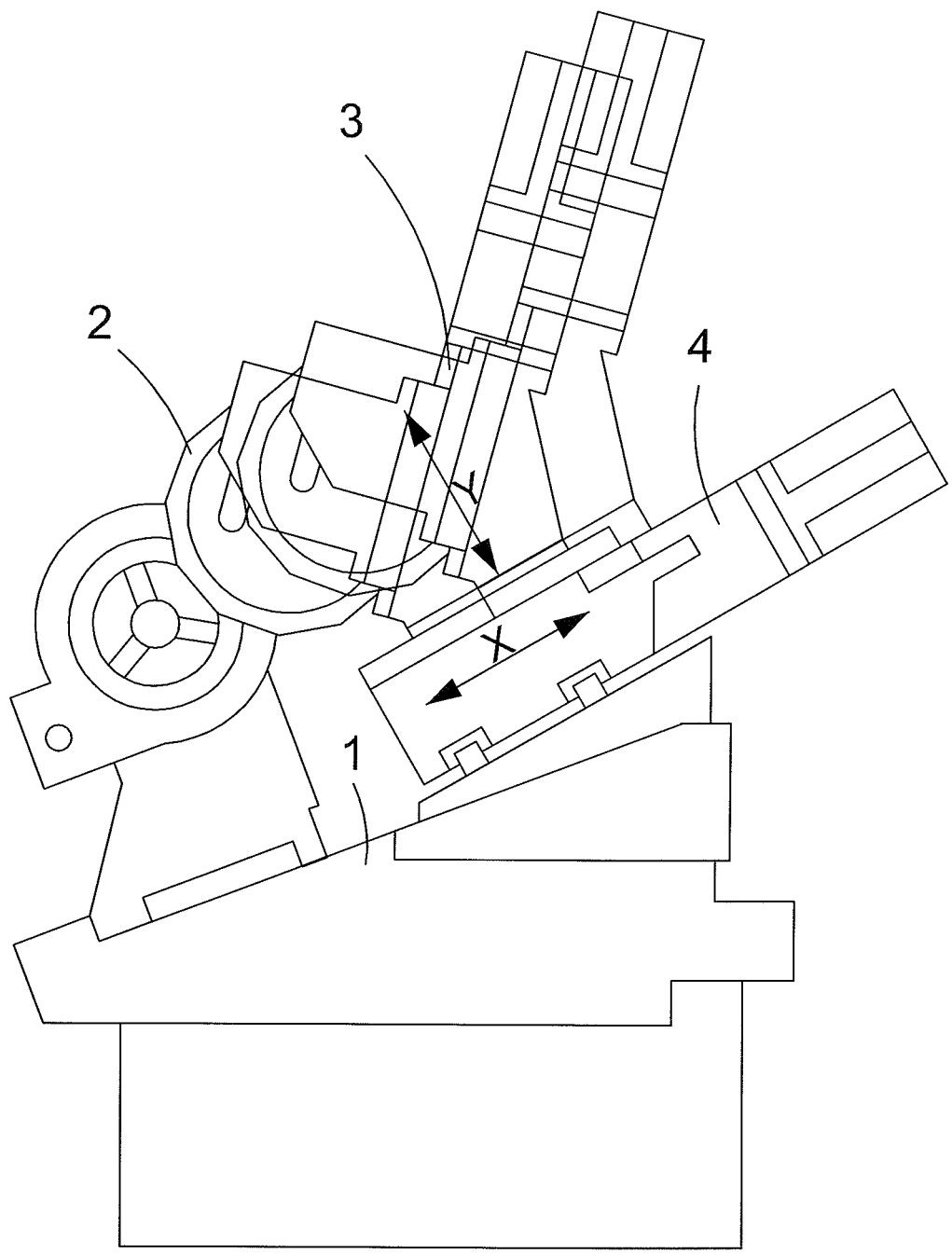
FIG. 1 is a side view of a first conventional working machine in accordance with the prior art.
Figure 2:
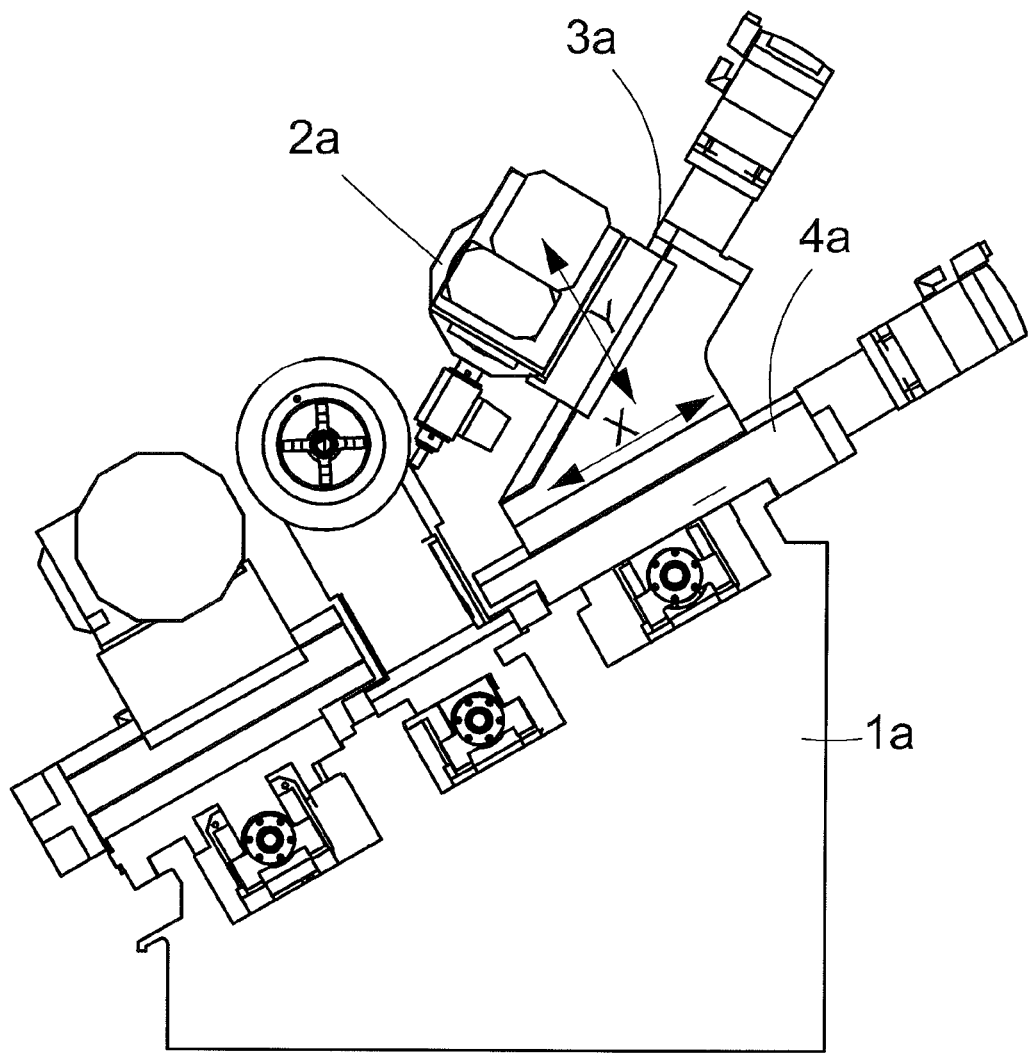
FIG. 2 is a side view of a second conventional working machine in accordance with the prior art.
Figure 3:
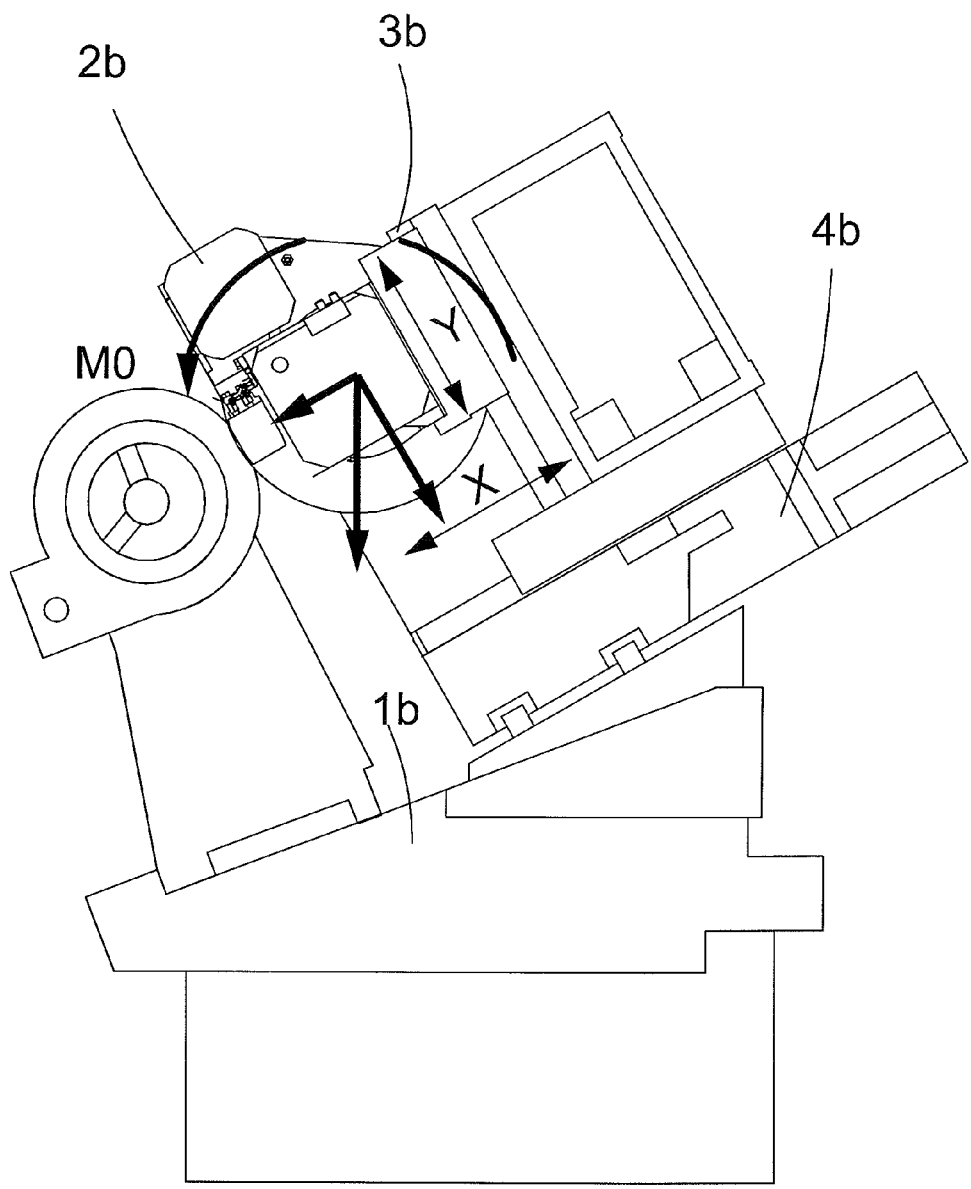
FIG. 3 is a side view of a third conventional working machine in accordance with the prior art.
Figure 4:
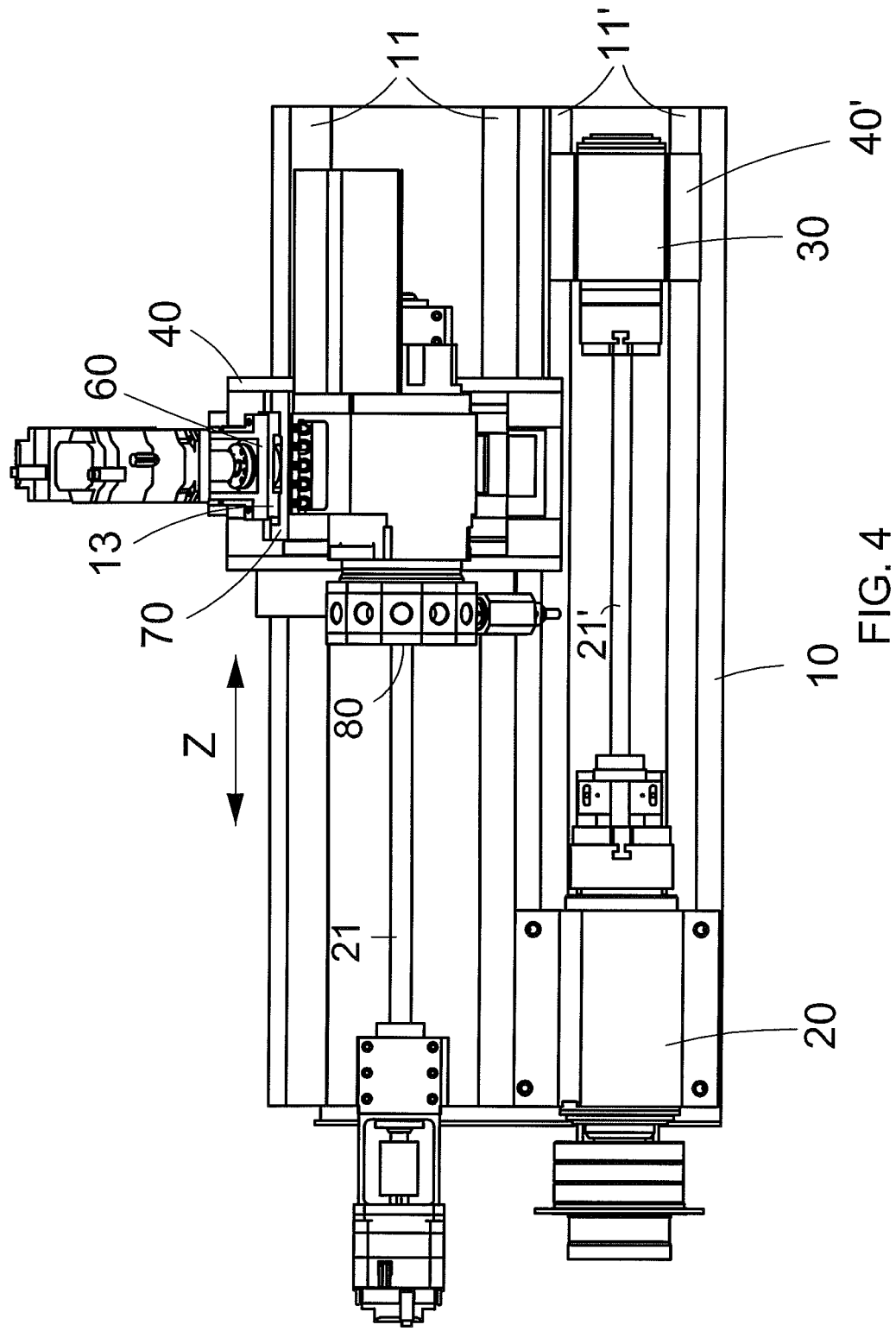
FIG. 4 is a top view of a working machine in accordance with the preferred embodiment of the present invention.
Figure 5:
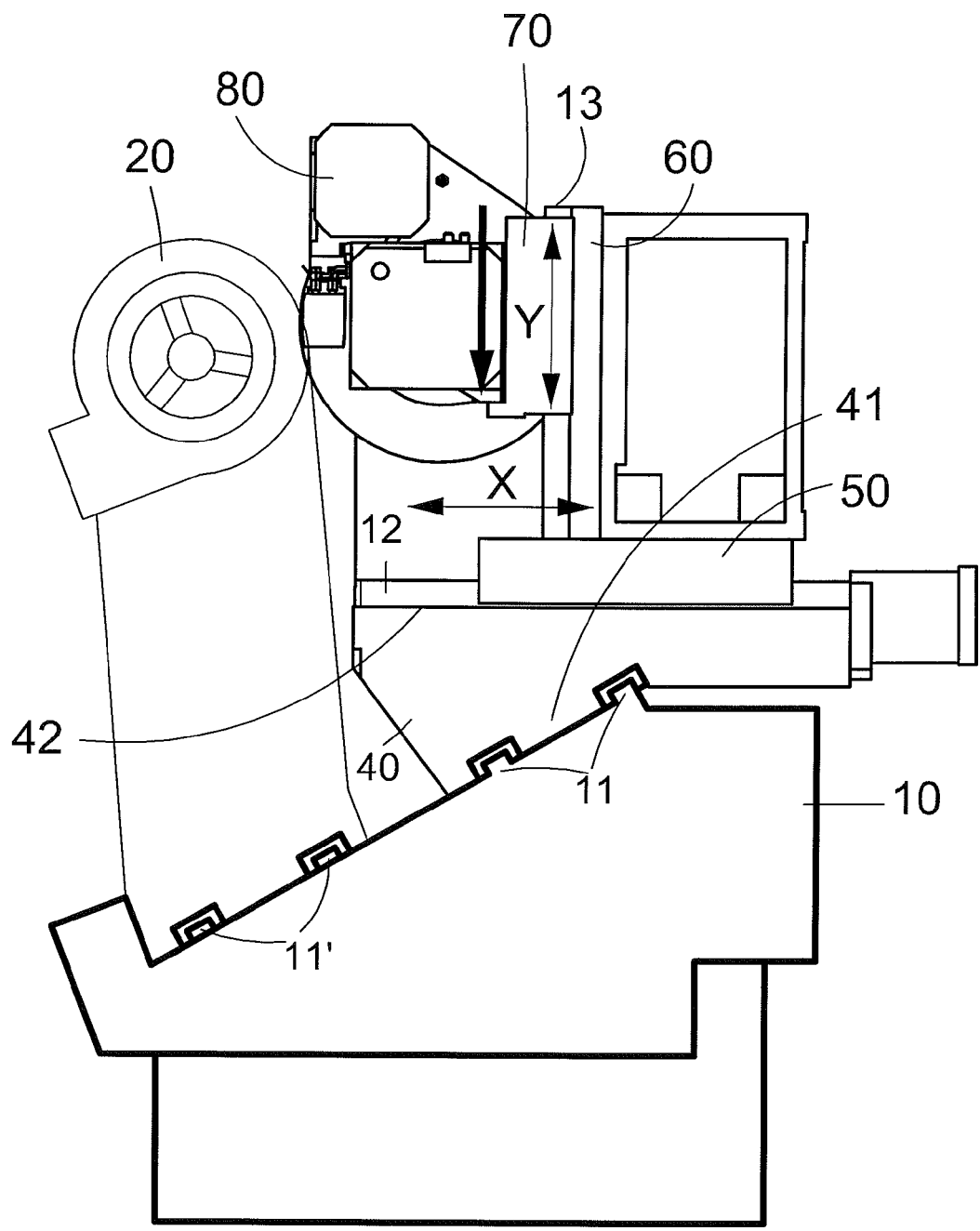
FIG. 5 is a side view of the working machine as shown in FIG. 4.

Referring to the drawings and initially to FIGS. 4 and 5, a working machine in accordance with the preferred embodiment of the present invention comprises a base 10, at least one z-axis track 11 mounted on the base 10, a secondary z-axis track 11' mounted on the base 10, at least one z-axis saddle 40 slidably mounted on the z-axis track 11, a secondary z-axis saddle 40' slidably mounted on the secondary z-axis track 11', a fixed seat 20 mounted on the secondary z-axis track 11', a movable seat 30 mounted on the secondary z-axis saddle 40' to move in concert with the secondary z-axis saddle 40' and to move relative to the fixed seat 20, at least one x-axis track 12 mounted on the z-axis saddle 40, at least one x-axis slide 50 slidably mounted on the x-axis track 12, at least one upright support 60 mounted on the x-axis slide 50, at least one y-axis track 13 mounted on the upright support 60, at least one y-axis slide 70 slidably mounted on the y-axis track 13, and at least one power cutter 80 mounted on the y-axis slide 70.

The z-axis saddle 40 is driven by a threaded rod 21 which is mounted in the z-axis track 11. The secondary z-axis saddle 40' is driven by a secondary threaded rod 21' which is mounted in the secondary z-axis track 11'. The x-axis track 12 is located above the z-axis track 11, and the y-axis track 13 is located above the x-axis track 12. The z-axis track 11 is extended in the Z-axis direction, the x-axis track 12 is extended in the X-axis direction, and the y-axis track 13 is extended in the Y-axis direction so that the power cutter 80 can be moved in a three-dimensional direction.

In the preferred embodiment of the present invention, the z-axis track 11 and the secondary z-axis track 11' are inclined relative to the ground so that the z-axis track 11 and the secondary z-axis track 11' are disposed at an inclined state. The z-axis saddle 40 is mounted between the z-axis track 11 and the x-axis track 12 and has an inclined bottom face 41 abutting the z-axis track 11 and has a horizontal top face 42 abutting the x-axis track 12. Thus, the x-axis track 12 is parallel with the ground so that the x-axis track 12 is disposed at a horizontal state, and the y-axis track 13 is perpendicular to the ground so that the y-axis track 13 is disposed at a vertical state. Therefore, the y-axis track 13 is perpendicular to the x-axis track 12.

Accordingly, the y-axis track 13 is disposed at a vertical state so that the y-axis track 13 is operated exactly and stably so as to facilitate operation of the working machine and to enhance the working precision and stability of the working machine. In addition, the y-axis track 13 is disposed at a vertical state and will not be disposed at an inclined state to prevent from producing a force moment so that the center of gravity of the y-axis track 13 is disposed at a steady state to prevent the y-axis track 13 from being deformed or worn out due to inclination so as to enhance the lifetime of the working machine. Further, the y-axis track 13 is disposed at a vertical state to facilitate an operator writing the working program and calibrating the working precision.

Figure 6:
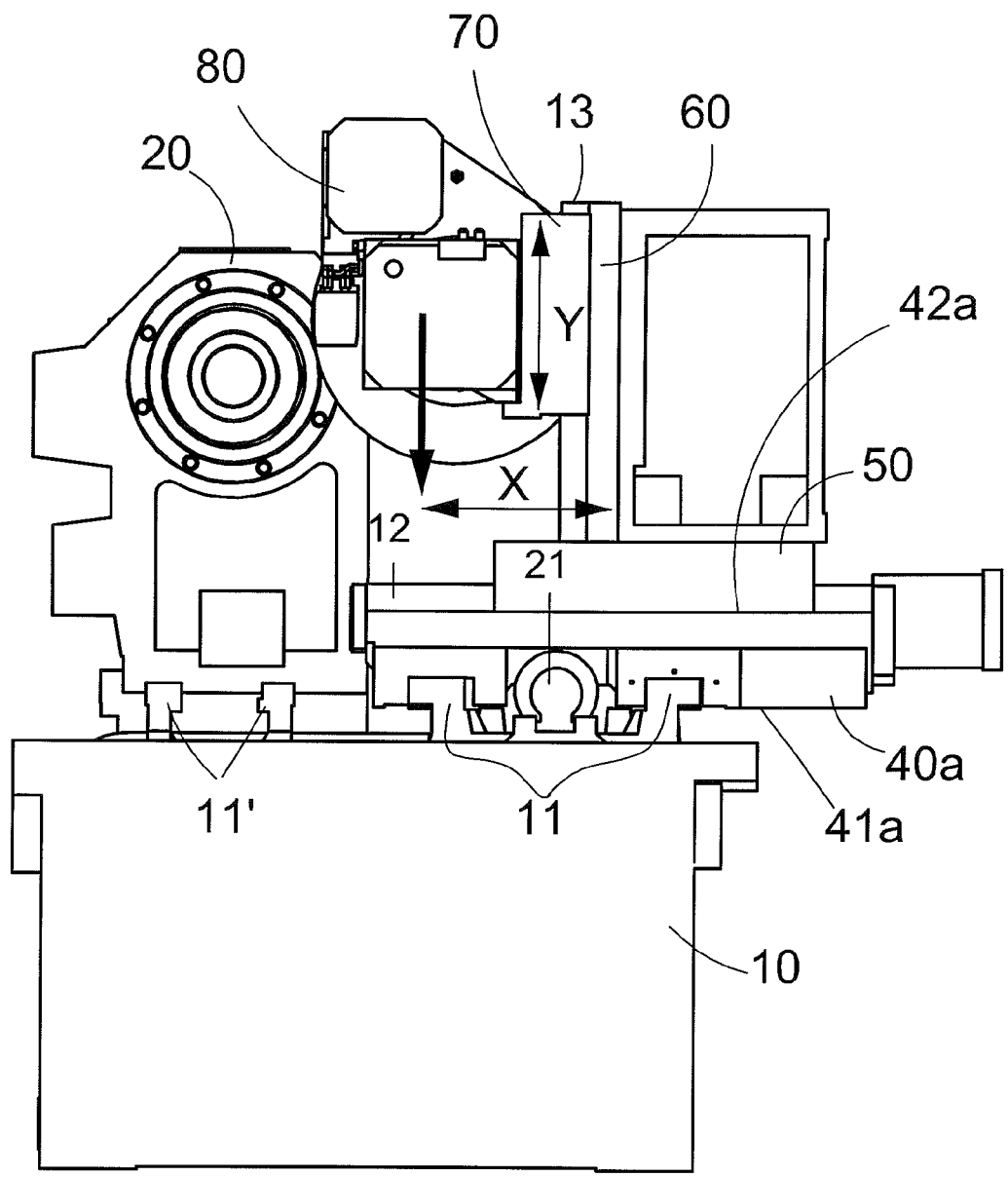
FIG. 6 is a side view of a working machine in accordance with another preferred embodiment of the present invention.

As shown in FIG. 6, the z-axis track 11 and the secondary z-axis track 11' are parallel with the ground so that the z-axis track 11 and the secondary z-axis track 11' are disposed at a horizontal state. The z-axis saddle 40a is mounted between the z-axis track 11 and the x-axis track 12 and has a horizontal bottom face 41a abutting the z-axis track 11 and has a horizontal top face 42a abutting the x-axis track 12. Thus, the x-axis track 12 is parallel with the ground so that the x-axis track 12 is disposed at a horizontal state, and the y-axis track 13 is perpendicular to the ground so that the y-axis track 13 is disposed at a vertical state. Therefore, the y-axis track 13 is perpendicular to the x-axis track 12.

Figure 7:
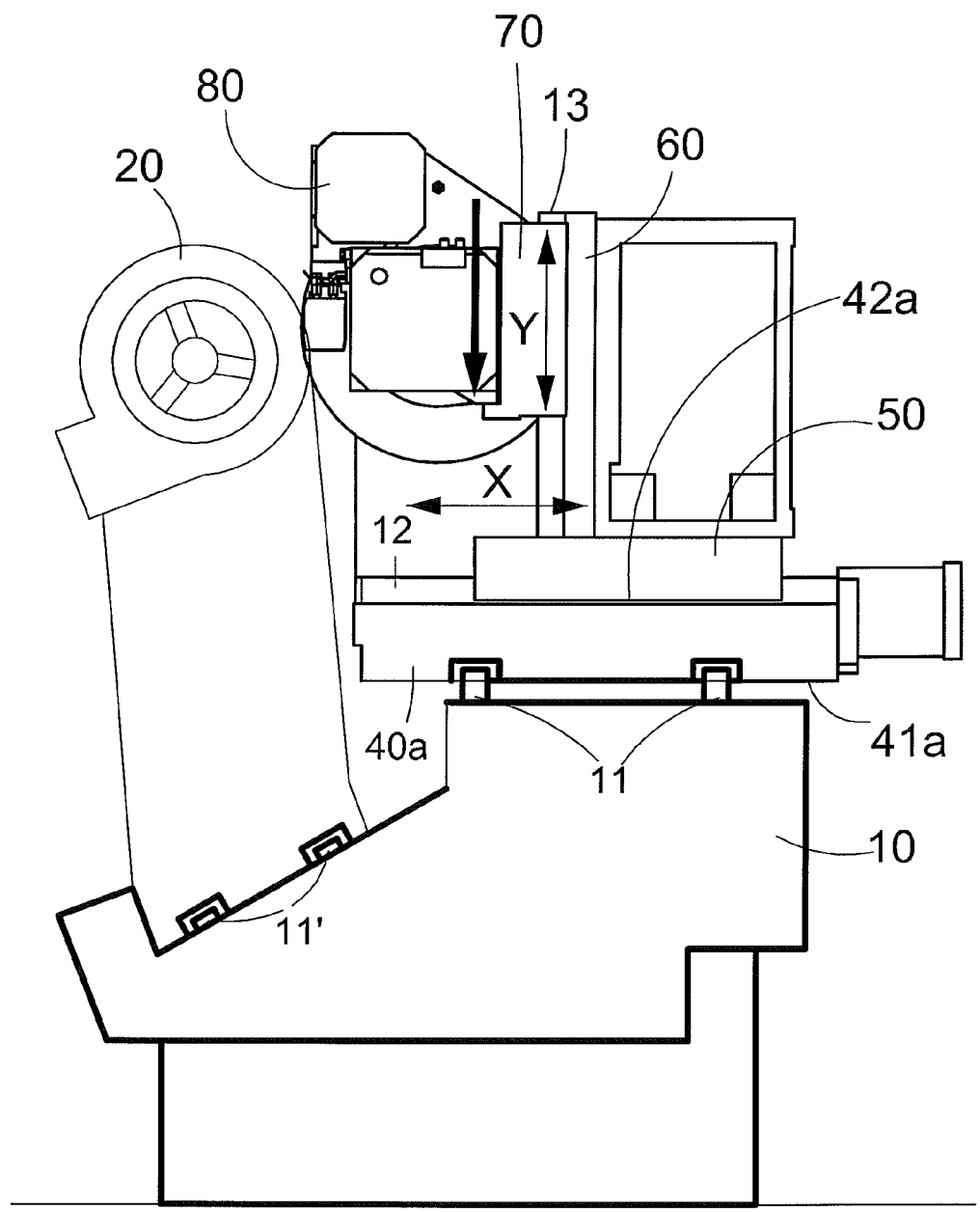
FIG. 7 is a side view of a working machine in accordance with another preferred embodiment of the present invention.

As shown in FIG. 7, the z-axis track 11 is parallel with the ground so that the z-axis track 11 is disposed at a horizontal state, and the secondary z-axis track 11' is inclined relative to the ground so that the secondary z-axis track 11' is disposed at an inclined state. The z-axis saddle 40a is mounted between the z-axis track 11 and the x-axis track 12 and has a horizontal bottom face 41a abutting the z-axis track 11 and has a horizontal top face 42a abutting the x-axis track 12. Thus, the x-axis track 12 is parallel with the ground so that the x-axis track 12 is disposed at a horizontal state, and the y-axis track 13 is perpendicular to the ground so that the y-axis track 13 is disposed at a vertical state. Therefore, the y-axis track 13 is perpendicular to the x-axis track 12.

Figure 8:
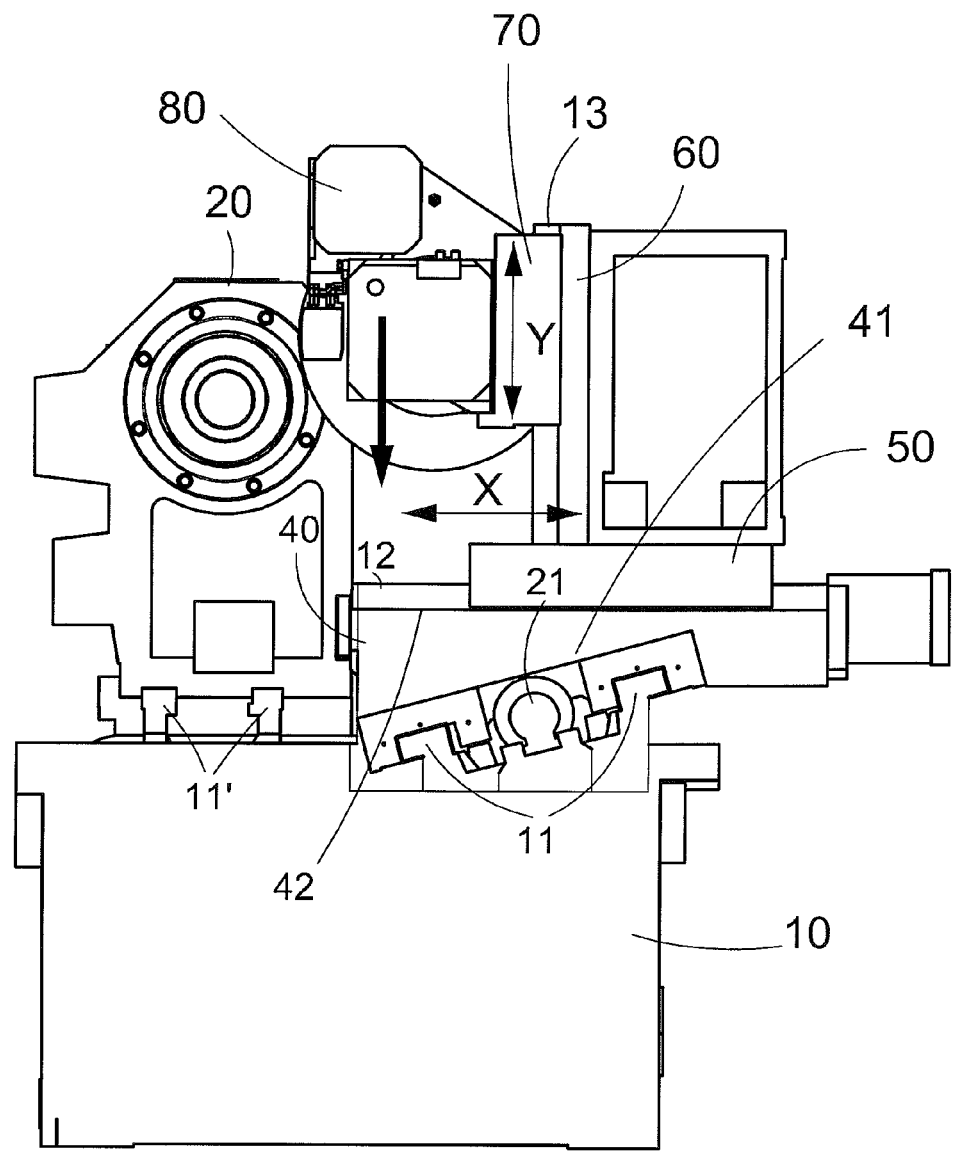
FIG. 8 is a side view of a working machine in accordance with another preferred embodiment of the present invention.

As shown in FIG. 8, the z-axis track 11 is inclined relative to the ground so that the z-axis track 11 is disposed at an inclined state, and the secondary z-axis track 11' is parallel with the ground so that the secondary z-axis track 11' is disposed at a horizontal state. The z-axis saddle 40 is mounted between the z-axis track 11 and the x-axis track 12 and has an inclined bottom face 41 abutting the z-axis track 11 and has a horizontal top face 42 abutting the x-axis track 12. Thus, the x-axis track 12 is parallel with the ground so that the x-axis track 12 is disposed at a horizontal state, and the y-axis track 13 is perpendicular to the ground so that the y-axis track 13 is disposed at a vertical state. Therefore, the y-axis track 13 is perpendicular to the x-axis track 12.

Figure 9:
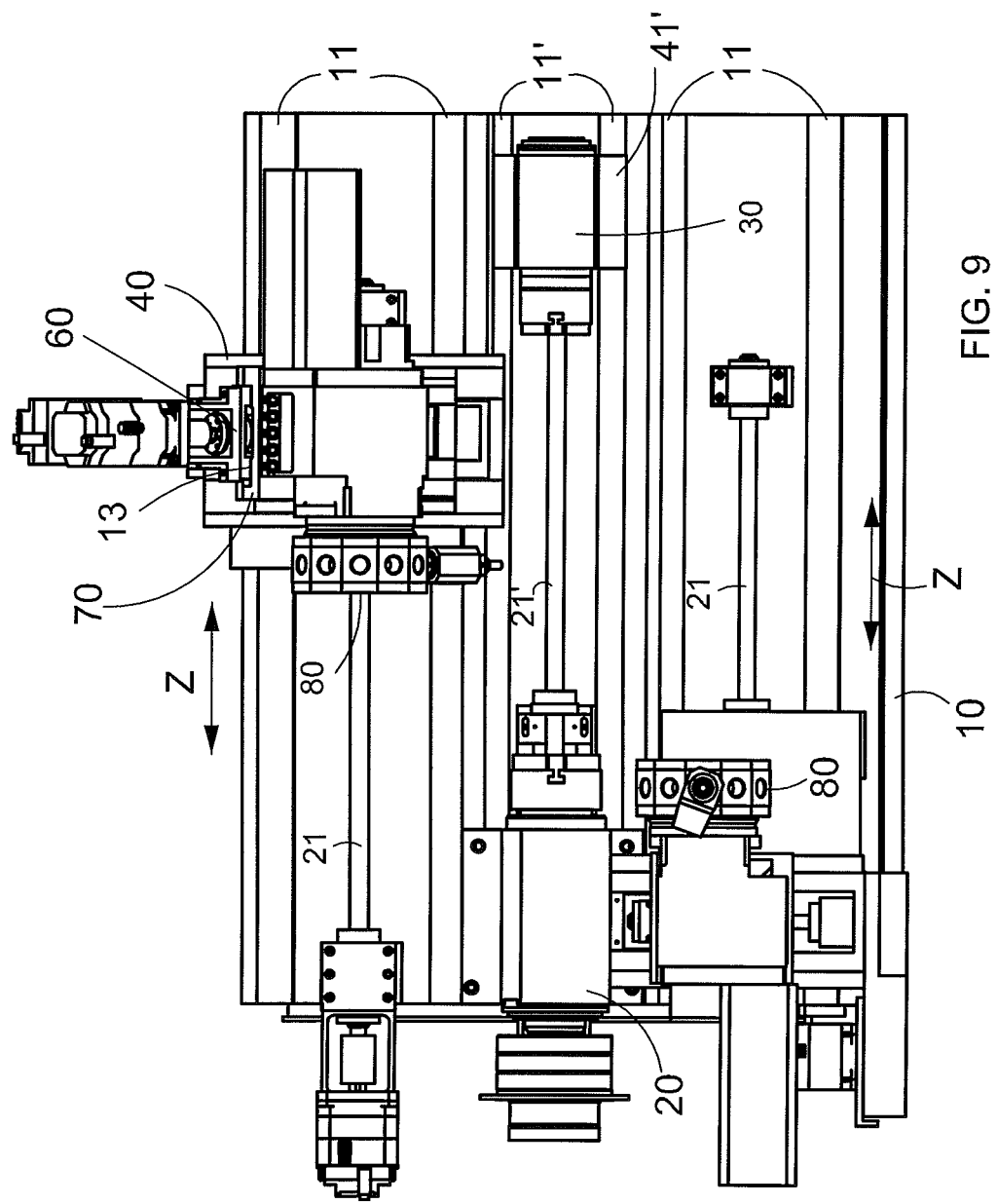
FIG. 9 is a top view of a working machine in accordance with another preferred embodiment of the present invention.
Figure 10:
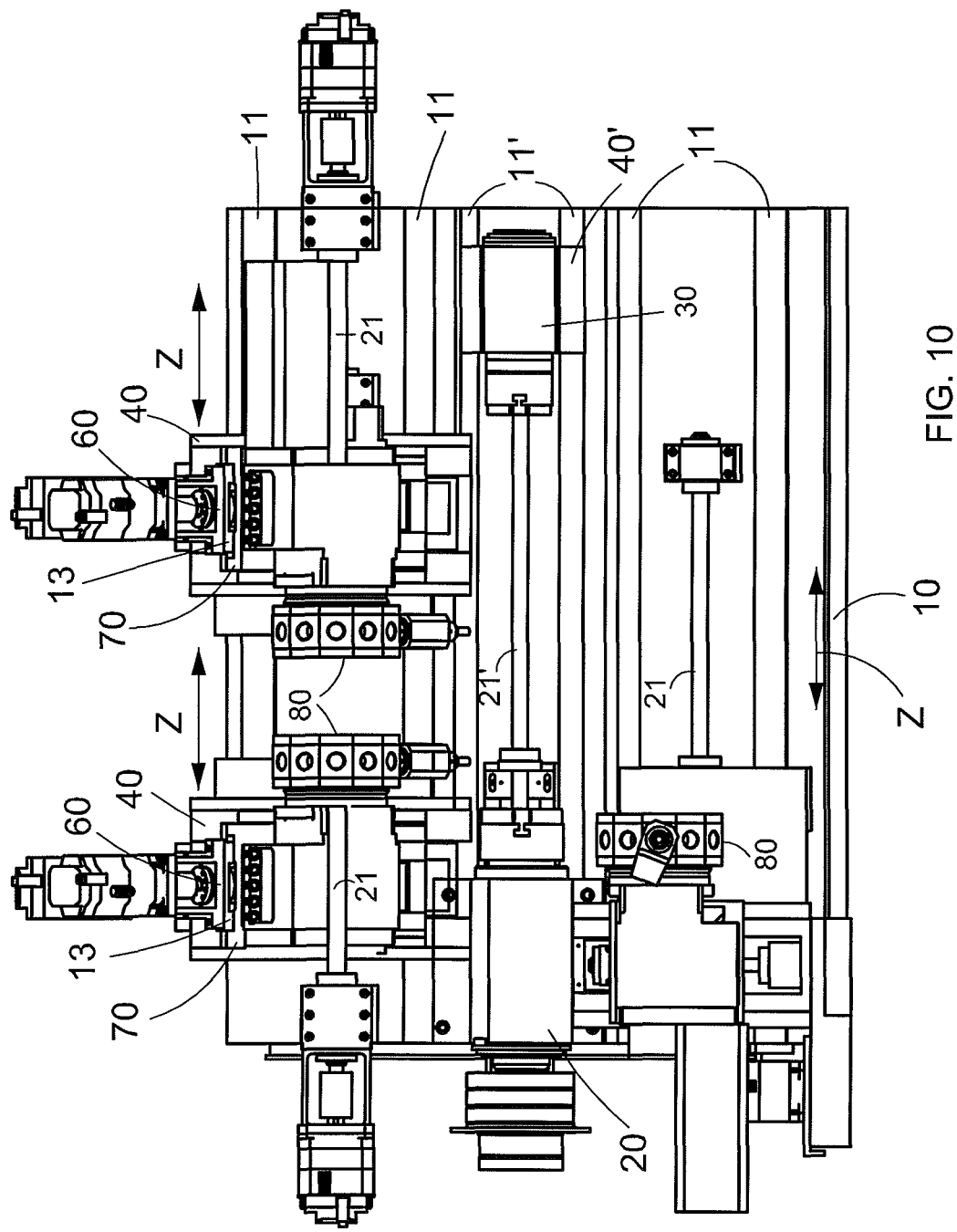
FIG. 10 is a top view of a working machine in accordance with another preferred embodiment of the present invention.
Figure 11:
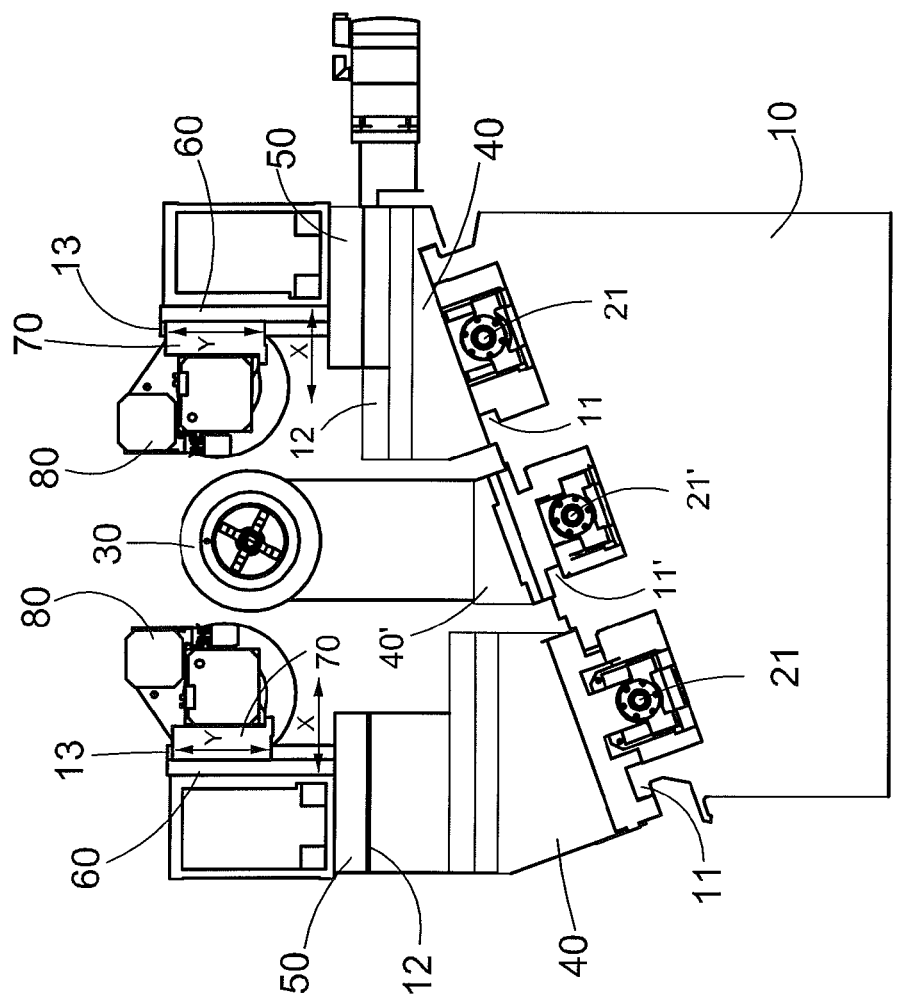
FIG. 11 is a side view of a working machine in accordance with another preferred embodiment of the present invention.

As shown in FIG. 9, the working machine comprises two z-axis tracks 11 mounted on the base 10, and the secondary z-axis track 11' is located between the two z-axis tracks 11. Each of the two z-axis tracks 11 is extended in the Z-axis direction As shown in FIG. 10, one of the two z-axis tracks 11 is provided with two z-axis saddles 40 each of which is movable in the Z-axis direction As shown in FIG. 11, each of the two z-axis tracks 11 is provided with a z-axis saddle 40, an x-axis track 12, an x-axis slide 50, an upright support 60, a y-axis track 13, a y-axis slide 70, and a power cutter 80. In addition, the two z-axis tracks 11 and the secondary z-axis track 11' are inclined relative to the ground so that the two z-axis tracks 11 and the secondary z-axis track 11' are disposed at an inclined state.

Figure 12:
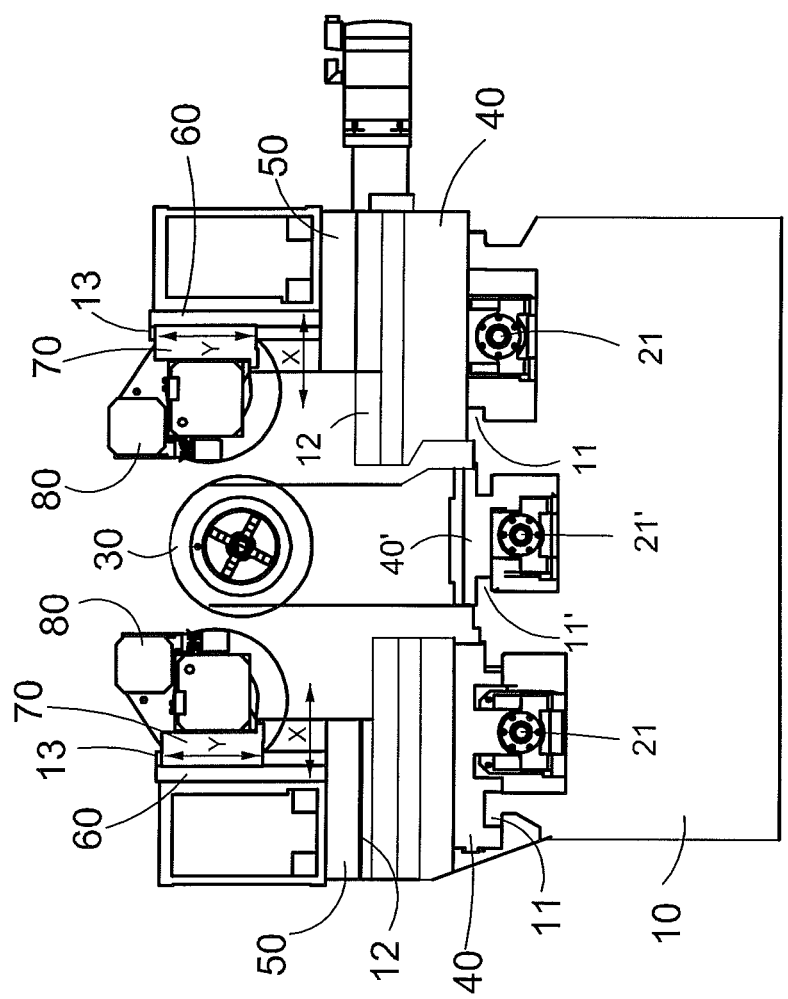
FIG. 12 is a side view of a working machine in accordance with another preferred embodiment of the present invention.

As shown in FIG. 12, the two z-axis tracks 11 and the secondary z-axis track 11' are parallel with the ground so that the two z-axis tracks 11 and the secondary z-axis track 11' are disposed at a horizontal state.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:
1. A working machine, comprising:
a base;
at least one z-axis track mounted on the base;
a secondary z-axis track mounted on the base;
at least one z-axis saddle slidably mounted on the z-axis track;
a secondary z-axis saddle slidably mounted on the secondary z-axis track;
a fixed seat mounted on the secondary z-axis track;
a movable seat mounted on the secondary z-axis saddle to move in concert with the secondary z-axis saddle and to move relative to the fixed seat;
at least one x-axis track mounted on the z-axis saddle;
at least one x-axis slide slidably mounted on the x-axis track;
at least one upright support mounted on the x-axis slide;
at least one y-axis track mounted on the upright support;
at least one y-axis slide slidably mounted on the y-axis track; and at least one power cutter mounted on the y-axis slide;
wherein the x-axis track is parallel to a horizontal plane so that the x-axis track is disposed at a horizontal state;

wherein the y-axis track is perpendicular to the horizontal plane;

wherein the y-axis track is perpendicular to the x-axis track;

wherein the z-axis track is inclined relative to the horizontal plane so that the z-axis track is disposed at an inclined state;

the secondary z-axis track is parallel with the horizontal plane so that the secondary z-axis track is disposed at a horizontal state; and the z-axis saddle has an inclined bottom face inclined with respect to the horizontal plane and with respect to a vertical plane, which bottom face abuts the z-axis track, and the z-axis saddle has a horizontal to face abutting the x-axis track.

2. The working machine of claim 1, wherein the x-axis track is located above the z-axis track;

the y-axis track is located above the x-axis track;

the z-axis saddle is mounted between the z-axis track and the x-axis track.

3. The working machine of claim 1, wherein the z-axis saddle is driven by a threaded rod which is mounted in the z-axis track;

the secondary z-axis saddle is driven by a secondary threaded rod which is mounted in the secondary z-axis track;

the z-axis track is extended in a Z-axis direction;

the x-axis track is extended in an X-axis direction;

the y-axis track is extended in a Y-axis direction.

\* \* \* \* \*